Patented June 9, 1942

2,285,992

UNITED STATES PATENT OFFICE 2,285,992

COMPOSITION FOR AND METHOD OF CLARIFYING TURBID AQUEOUS SOLUTIONS

Rowland R. Magill, Lakewood, Ohio, assignor to Peabody Coal Company, Chicago, Ill., a corporation of Illinois No Drawing. Application April 19, 1940, Serial No. 330,472

7 Claims. (Cl. 210—23)

This invention relates to a composition for and to a method of clarifying turbid aqueous solutions. More particularly the invention relates to a composition of matter for use in the treatment of municipal and industrial waters to clarify the same.

In conventional sedimentation processes for the treatment of water, it is customary to employ alum and lime to bring about a flocculation that serves to carry down the matter suspended in the water undergoing treatment. I have now devised a different type of composition for the treatment of water, the use of which results in a more effective clarification of the water than is possible through the use of the conventional alum and lime treatment.

According to my present invention, a treating composition is prepared by mixing together pulverized, high volatile coal, ferric sulfate, sodium meta silicate and a di- or trisodium phosphate. It has heretofore been proposed to use humic substances, such as peat, lignite or brown coals, in the purification of water, as disclosed in the Borrowman Patent No. 2,090,467, but only as a filter bed in connection with a base exchange method of purification. I have found, moreover, that the humic substances named in that patent are not adapted for use in the method of my present invention, since the presence of humic substances tends to prevent rather than bring about the fluocculation that is so essential to the effectiveness of my method.

For my purposes, I find it desirable to use a high volatile coal for the reason that this type of coal, when in finely divided form, has a strong tendency to float when first added to water. The floating or suspended particles of the coal serve as nuclei for the formation of flocs, produced by the interaction of the chemical compounds associated with the coal and the dissolved salts normally present in the water. The rapid settling of the flocs so formed is facilitated by the wetting action of the di- or trisodium phosphate on the coal particles, with the result that the settling out of the flocs, together with the adsorbed or occluded suspension matter in the water takes place more rapidly than when alum and lime are used in the conventional sedimentation processes.

It is therefore an important object of this invention to provide a composition for use in the clarification of turbid waters, the ingredients and proportions of such composition being so selected as to form a rapidly settlable floc that effectively carries down with it the suspended matter causing turbidity in the water.

It is a further important object of this invention to provide a method of clarifying turbid waters by the use of a composition comprising high volatile coal particles and chemicals associated therewith capable of interacting to form an effective floc about the coal particles as nuclei and of wetting such coal particles to bring about their rapid subsidence after floc formation has taken place.

It is a further important object of this invention to provide an improved composition for use in the clarifying of turbid aqueous solutions that is superior to the conventional alum, or alum and lime heretofore used.

The composition of my invention comprises a dry mixture of high volatile coal, ground to 20 mesh or finer, ferric sulfate, sodium meta silicate, and di- or trisodium phosphate, preferably disodium phosphate. By "high volatile coal" is meant a coal having an analysis that parallels the analysis of Christian County, Illinois coal. A typical analysis of Christian County, Illinois coal is as follows:

| | As received | Dry |
|---|---|---|
| Moisture | 13.72 | |
| Ash | 14.28 | 16.54 |
| Volatile | 33.13 | 38.36 |
| Carbon | 38.37 | 45.10 |
| Sulfur | 4.61 | 5.34 |
| B. t. u | 10,100 | 11,668 |

The important characteristic of high volatile coal that makes it so eminently satisfactory for my purposes is the tendency of the coal, when in finely divided form, to float in water. Owing to this property of high volatile coal, its presence in the treating composition in major proportions serves to prevent the composition, upon its addition to water, from sinking rapidly to the bottom of the treating vessel and by keeping the composition in a floating or suspended state for a longer period after its addition serves to increase the effectiveness of the flocculating action. By reason of the buoyant properties of the high volatile coal particles, a major proportion of the floc formation and growth occurs at or near the surface of the water, with the result that during the settling out of the floc, the suspended matter causing turbidity in the water is very effectively carried down with the floc.

The ferric sulfate and sodium meta silicate present in my treating composition react, upon addition to water, to form an iron silicate floc. Ferric chloride is not the equivalent of ferric sulfate for this purpose, since the chloride ion content of ferric chloride would tend to retard the settling out of the flocs. Ferrous sulfate is not a satisfactory substitute for ferric sulfate because, owing to its hygroscopic nature, it would be likely to form an insoluble compound with the silicate while the composition is in storage and prior to its use. Consequently, I prefer to use ferric sulfate. Either the anhydrous or hydrated form of ferric sulfate can be employed.

Of the alkali metal silicates, I prefer to use sodium meta silicate, either in its anhydrous or hydrated form. Any alkaline metal silicate that is available in crystalline or solid form may be used.

Both the di- and trisodium phosphates are suitable for use in the preparation of my composition, but the disodium phosphate is preferred. The meta and pyro phosphates do not work out so satisfactorily, partly owing to their lower solubility in cold water. In addition to acting as a wetting agent to wet out the coal particles, the di- and trisodium phosphates aid in floc formation and growth.

The following will serve to illustrate a preferred analysis of my treating composition:

|  | By wt., per cent |
|---|---|
| High volatile coal | 68–70 |
| Ferric sulfate, $Fe_2(SO_4)_3$ | 13–17 |
| Sodium meta silicate, $Na_2SiO_3$ | 3–7 |
| Disodium phosphate, $Na_2HPO_4 \cdot 12H_2O$ | 3–7 |

The proportion of high volatile coal in the composition may vary between 50 and 80% by weight. With variations of the coal content within the range indicated, however, the relative proportions of ferric sulfate, sodium meta silicate and di- or trisodium phosphate should be kept roughly within the ratios indicated for these ingredients in the above formula. In other words, the ratio of iron sulfate to sodium meta silicate or to di- or trisodium phosphate should be between 2 to 1 and about 6 to 1. If the respective ingredients are permitted to vary considerably beyond these proportions, one or more of the ingredients gets out of balance, with the result that the flocculating action is not so complete and efficient as it should be in the removal of the added chemicals as well as in the clarification of the water undergoing treatment. It is not desirable to have an excess of sodium silicate, since that would leave sodium silicate in solution in the treated water, after sedimentation. Similarly, an excess of ferric sulfate would result in free iron compounds being left in suspension after flocculation and sedimentation. Thus, when the composition is out of balance, non-settlable, fine flocs are likely to be formed and the treated water may appear opalescent due to the presence of suspended or dispersed colloidal matter.

In making up the dry composition of my invention, the various ingredients are mixed in a dry state. The coal is preferably ground separately and then mixed with the other ingredients, although the grinding may be carried out after mixing. The final composition is thus in the form of a dry, pulverulant mass that can be readily packaged for shipment to the point of its use.

While it would be possible to add the ingredients separately to the water that is to be treated, such a method would not be nearly so satisfactory as adding a prepared mixture having the constituent chemicals and coal present in the proper proportion. My invention does not exclude, however, the possibility of adding the several ingredients separately to the water undergoing treatment.

The equipment and technique to be used in connection with the treatment of water with the composition of my invention are similar to those conventionally used in the alum and lime method of treating water. A portion of the water to be treated is diverted into a mixing chamber, where my composition is added, and after being thoroughly mixed and passed over baffles, the portion of the water so treated is then admixed with the main body of water. The rate of flow of the main body of water is adjusted so that flocculation and precipitation can be rendered complete before the water leaves the sedimentation base.

In accordance with the alum and lime method treatment, it is feasible, in carrying out my method, to add lime in addition to the composition above described. The lime may be added either before, during or after the addition of my treating composition, but it is preferable to add the lime after my treating composition has been added. The lime aids in the flocculation by accelerating the action of the coagulants present. The amount of lime to be added will depend upon the calcium content of the water undergoing treatment and can be readily determined by those skilled in the art.

The amount of my composition to be added to the water will also depend upon the analysis of the water, the amount of suspended matter and other factors usually taken into consideration in similar treatments of water. Ordinarily, a ton of my composition will be the equivalent of about four tons of alum in the alum and lime method of treating water. My composition has the added advantage over the use of alum and lime in that the latter combination will not remove transparent algae from suspension in water, whereas my composition will.

As indicated previously, the coal particles provide an extended surface for floc formation. In combination with the other ingredients of my composition, the coal particles serve to produce a gelatinous composition in the form of flocs, which during growth gather to themselves the suspended matter causing turbidity in the water and also the undesirable constituents of the water, such as those giving rise to odors. After sedimentation is complete, the treated water is left in a clear, purified condition.

It will, of course, be understood that various details of the process may be varied through a wide range without departing from the principles of this invention and it is, therefore, not the purpose to limit the patent granted herein otherwise than necessitated by the scope of the appended claims.

I claim as my invention:

1. A water treating composition comprising a dry mixture including major proportions of pulverulent high volatile coal and minor but substantial proportions of ferric sulfate, sodium silicate and a sodium phosphate.

2. A composition for use in the clarification of turbid water comprising a mixture of major proportions of a high volatile coal of such particle size as to be capable of temporarily floating on water, and minor but substantial proportions of ferric sulfate, sodium silicate and a sodium phosphate in amounts such as to react upon introduction into water to form a gelatinous floc that will remove substantially all of the constituents of the composition upon being settled out.

3. The method of clarifying turbid aqueous solutions which comprises adding to water to be clarified a mixture including major proportions of high volatile coal in finely divided condition and minor but substantial proportions of ferric sulfate, sodium silicate and a sodium phosphate.

4. A water treating composition comprising from 50 to 80% of pulverulant high volatile coal, from 13 to 17% of ferric sulfate, from 3 to 7% of sodium meta silicate and from 3 to 7% of a sodium phosphate.

5. A water treating composition comprising about 68 to 70% of a high volatile coal in finely divided condition, 13 to 17% of ferric sulfate, 3 to 7% of sodium meta silicate and 3 to 5% of disodium phosphate.

6. The method of clarifying turbid aqueous solutions, which comprises adding to water to be clarified a mixture of from 50 to 80% of a high volatile coal in finely divided state, and minor but substantial amounts of ferric sulfate, sodium meta silicate and a sodium phosphate in such proportions as to form a gelatinous floc that upon settling out will remove substantially all of the constituents of said mixture.

7. The method of clarifying turbid aqueous solutions, which comprises adding to water to be clarified a mixture of from 50 to 80% of a high volatile coal, from 13 to 17% of ferric sulfate, from 3 to 7% of sodium meta silicate and from 3 to 7% of disodium phosphate.

ROWLAND R. MAGILL.